United States Patent
Aubert et al.

(10) Patent No.: US 6,339,759 B1
(45) Date of Patent: *Jan. 15, 2002

(54) METHOD OF DETERMINING AN ACOUSTIC MODEL FOR A WORD

(75) Inventors: Xavier Aubert, Brussels (BE); Peter Beyerlein, Aachen; Meinhard D. Ullrich, Köln, both of (DE)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,641

(22) Filed: Sep. 30, 1997

(30) Foreign Application Priority Data

Oct. 1, 1996 (DE) .......................................... 196 40 502

(51) Int. Cl.$^7$ ............................................... G10L 17/00
(52) U.S. Cl. ........................................ 704/254; 704/251
(58) Field of Search ................................ 704/231, 240, 704/251, 254, 256

(56) References Cited

U.S. PATENT DOCUMENTS 5,502,790 A * 3/1996 Yi ............................... 704/256
5,794,197 A * 8/1998 Alleva et al. ................ 704/255

OTHER PUBLICATIONS

Aubert Xavier et al, "A Bottom–Up Approach for Handling Unseen Triphones in Large Vocabulary Continuous Speech Recognition", Proceedings ICSLP 96, 4th Int'l Conference on Spoken Language Processing (CAT. No. 96TH8206), Proceedings of 4th Int'l Conference on Spoken Language Processing, ICSLP, 1996, Oct. 3–6, 1996, pp. 14–17, vol. 1, XP–002082058, ISBN 0–7803–3555–4, 1996, New York, NY IEEE.

* cited by examiner

*Primary Examiner*—Fan Tsang
*Assistant Examiner*—Michael N. Opsasnick
(74) *Attorney, Agent, or Firm*—Russell Gross

(57) ABSTRACT

For the recognition of spoken text it is necessary that the words to be recognized are available in acoustically modeled form, i.e. in the form of a sequence of reference values. These reference values are determined from a known, spoken text during a training phase, in that from this text there are derived characteristic values at regular intervals, as during the recognition, which characteristic values are arranged according to triphones so as to form groups or so-called clusters. These groups constitute the basis for the reference values. In the case of a recognition system involving a very large vocabulary, however, not all triphones will occur during the training phase, unless the text is prohibitively long. In order to enable the reference values to be determined also for words containing triphones which have not occurred, such a triphone must be associated with an available group. To this end, all groups are examined so as to determine whether they have the same central phoneme in interrelationship with either the left-hand or the right-hand phoneme as the triphone to be associated. The group for which this is most often the case is selected as the associated group. The vast majority of words can thus be modeled on the basis of triphones. Modifications of this rule are described for words containing triphones which cannot be directly associated in this manner.

5 Claims, 1 Drawing Sheet

METHOD OF DETERMINING AN ACOUSTIC MODEL FOR A WORD

BACKGROUND OF THE INVENTION

The invention relates to a method of determining an acoustic model for a word as a sequence of reference values which are required for the later recognition of words from a speech signal.

For the recognition of words in a speech signal, test signals are temporally successively derived therefrom and compared with reference values; sequences of reference values then represent different words and the reference values which are most similar to the test signals indicate the word recognized with the highest probability. During a preceding training phase, the reference values are derived from the speech signal of a known text wherefrom test signals are derived in the same manner; these test signals are first combined so as to form characteristic values which represent acoustic states in the known words. Each phoneme in the word has a sequence of acoustic states and the characteristic values observed for the individual acoustic states are combined for the same phonemes, that is in dependence on the preceding and the subsequent phoneme which constitute a triphone in conjunction with the central phoneme. In conformity with the representation of the sequence of the acoustic states from left to right on the time axis, the phonemes of a triphone are also referred to as left-hand phoneme, central phoneme and right-hand phoneme. When the characteristic values for the individual acoustic states in the triphones of the known words have been determined, the characteristic values of the same acoustic states of different triphones which satisfy predetermined criteria are combined so as to form step-wise larger groups. Such a criterion is notably the distance between characteristic values in the characteristic space; more specifically, groups of characteristic values in which the distance between the characteristic values which are situated furthest apart is less than a predetermined distance are combined so as to form a larger group. The number of observations in each characteristic value represents a further criterion. If this number is too small, such a characteristic value is combined with the nearest group so as to form a larger group.

When all groups have been formed in this manner, the word models for the recognition must be generated. Each word model consists of a sequence of reference values which describe the word. It is to be noted that in known speech recognition methods, notably for a large vocabulary, a reference word does not represent a single value but a distribution function. The consideration of triphones means that for the central phoneme in each triphone the left-hand and the right-hand interrelationship are taken into account, because this interrelationship has a pronounced effect on the pronunciation of the phoneme.

During the training phase a text of limited length, in which not all triphones occurring in a language are contained, is spoken. This is inter alia because of the fact that not all words of the vocabulary are spoken in the text of limited length. However, such words must nevertheless be modeled in order to ensure that in the subsequent recognition phase they can also be recognized when they occur in the speech signal. It may be assumed that all phonemes have occurred during the training phase. However, if a phoneme occurs as the central part of a triphone in a word which has not been spoken during the training phase, and this triphone has not been spoken during the training phase, this triphone or this phoneme cannot be simply modeled in the framework of this triphone. One possibility of eliminating this difficulty consists in replacing a phoneme in a non-trained triphone by a reference value which is derived from the possibly weighted mean value of all triphones containing this phoneme which have occurred in the training phase. However, this yields poor modeling and gives rise to an increased recognition error rate.

SUMMARY OF THE INVENTION

Therefore, it is an object of the invention to provide a method which also offers suitably exact modeling of words which contain at least one triphone which has not occurred during the training phase.

This object is achieved essentially in that for such a non-observed triphone there is selected a group which is associated with the same phoneme in interrelationship with the same left-hand or the same right-hand phoneme. Thus, the similarity of a triphone with a given left-hand interrelationship and a given right-hand interrelationship is determined for the respective other interrelationship, since most of the two interrelationships actually occur also when a text of limited length is used during the training phase. This association with groups is performed separately, for each acoustic state in this triphone to be modeled or, more accurately speaking, for each acoustic state of the central phoneme within the relevant triphone, there only being selected groups which belong to the same acoustic state in the triphones observed. The interrelationship of a phoneme within a triphone can thus be substantially accurately determined so that a quite appropriate sequence of reference values can thus be formed also for words which have not occurred during the training phase.

The same phoneme with the same left-hand or the same right-hand phoneme and a different phoneme at the respective other side may very well occur in different groups. Because in that case a group cannot be unambiguously selected directly, the group is selected which contains the largest number of left-hand or right-hand interrelationships corresponding to the triphone to be modeled. As a result, the probability that correct modeling will be found becomes very high.

As has already been stated, for each state of the non-observed triphone to be modeled there is only selected a group which is associated with the same state. Because for the first states in the triphone to be modeled, being situated to the left of the central phoneme in the representation on the time axis, the effect of the left-hand phoneme will be stronger than that of the right-hand phoneme in the triphone, whereas for the last states at the right-hand side the situation will be reverse, in a further embodiment of the invention for the first states in the triphone to be modeled the number of interrelationships with the same central phoneme and the same left-hand phoneme is advantageously increased by a fixed value in order to accentuate their effect. The same holds for the last states for which the number of interrelationships with the same central phoneme and the same right-hand phoneme is increased by a fixed value.

However, it may also occur that for given triphones there is no group which is associated with the same central phoneme in conjunction with the same left-hand or right-hand phoneme as the triphone to be modeled. In this case the rules for searching a group must be changed. One possibility consists in searching, for a given state of the triphone to be modeled, a group which is not associated with the same state but with a different state. In other words, the state can be completely ignored while searching for an appropriate group. Another, possibly additional possibility consists in examining all groups which contain the left-hand or the right-hand phoneme in interrelationship with an arbitrary central phoneme, the numbers of such triphones being weighted. This modeling is not as good as the previously described modeling, but still yields usable reference values for words with non-trained triphones, resulting in a low recognition error rate.

The problem addressed by the invention and its solution can be expressed in mathematical terms as follows:

$$\hat{K} = \underset{K}{\operatorname{argmax}} \sum_{tr \in K} P(tr \mid tr')$$

$$= \underset{K}{\operatorname{argmax}} \sum_{tr \in K} P(tr, tr')$$

This means that that group R is to be found for which the probability that it contains the triphone tr' to be modeled is the highest from among all groups K, given certain triphones in this group. This probability can be rewritten as follows:

$$P(tr, tr') \approx P_{c,s}(r,r') \cdot P_{c,s}(l,l')$$

This leads to the described solution of searching the group which exhibits the same left-hand phoneme or the same right-hand phoneme, l and r, respectively, for the same central phoneme c and the same state.

BRIEF DESCRIPTION OF THE DRAWINGS

Details of the invention will be described hereinafter with reference to the drawing. Therein:

FIG. 3 is diagram showing one example of the method according to the present invention.

DESCRIPTION OF THE PREFERRED EMBODIMENTS

Figure 1:
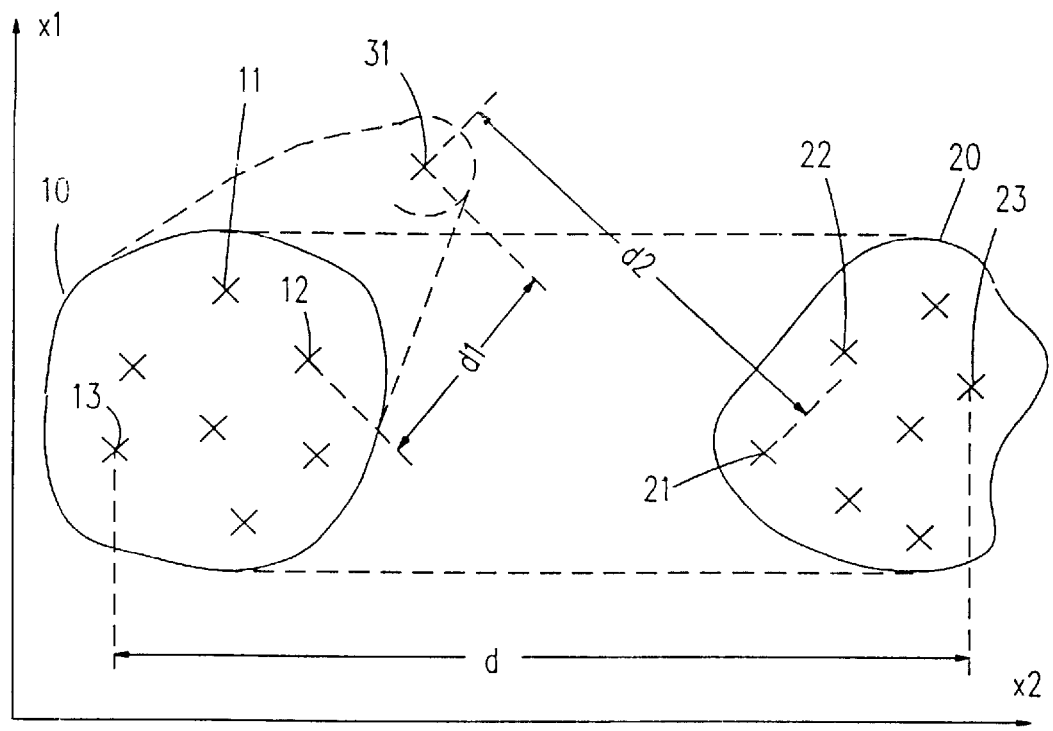
FIG. 1 shows the combination of characteristic values so as to form groups in the characteristic space.

FIG. 1 is a strongly simplified representation of a characteristic plane with only two characteristic components x1 and x2. Generally, the test values derived from a speech signal during speech recognition, and hence the characteristic values, in reality contain more than 30 components. Two characteristic groups 10 and 20 are indicated which contain individual characteristic values 11, 12, 13 etc. and 21, 22, 23 etc., respectively. Each of these characteristic groups combines the observations of a given triphone occurring during a test phase. The two characteristic groups 10 and 20 are combined so as to form a larger group if the distance d between the characteristic values which are situated furthest apart in the two groups, denoted by 13 and 23 in FIG. 1, is less than a predetermined value. The two groups 10 and 20 are also combined if the number of characteristic values is less than a predetermined value in at least one of these groups. This is denoted by the dashed connection between the two groups.

The characteristic value 31 is assumed to represent a characteristic value of a triphone which was only rarely observed during the training phase. Assuming that the two groups 10 and 20 are separate groups, the distance d1 between the characteristic values 31 and 12 is determined as the next characteristic value of the group 10 and the distance d2 between the characteristic values 31 and 21 as the next characteristic value of the group 20, the characteristic value 31 being combined with that group for which the distance d1 or d2 is shortest as is also denoted by dashed lines. In this respect it is assumed that the distances d1 and d2 are larger than the distance at which the two groups are combined, because otherwise the characteristic value 31 would already be combined with a group on the basis of this combination rule.

Groups of characteristic values are thus formed for the individual triphones observed.

Figure 2:
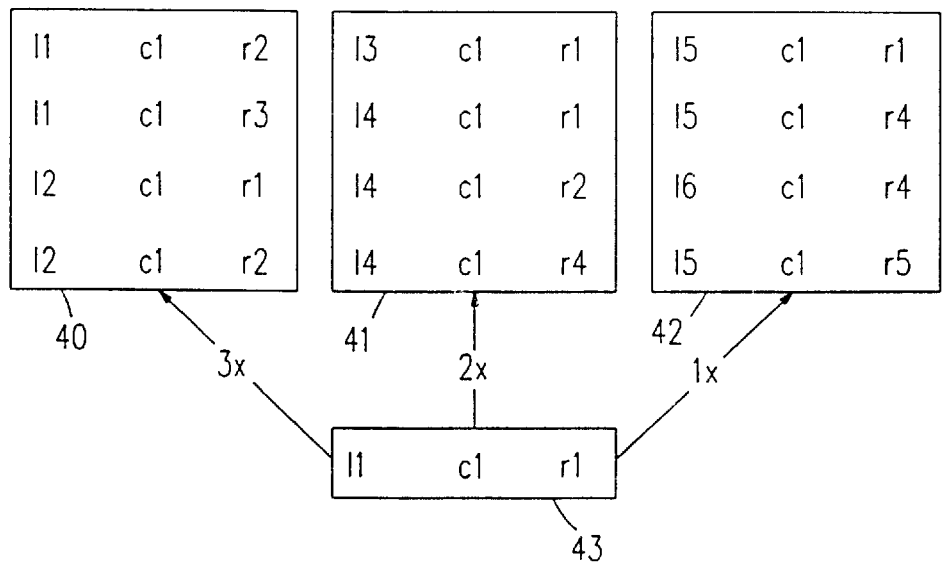
FIG. 2 shows diagrammatically the association of a triphone to be modeled with one of various groups.

FIG. 2 shows diagrammatically three groups 40, 41, and 42 of characteristic values, the characteristic values for four different triphones being indicated in each group. Each triphone consists of a left-hand phoneme 1, a central phoneme c and a right-hand phoneme r. The number given for each phoneme distinguishes different phonemes from one another. It is to be determined to which of these groups a triphone 43 having the phonemes l1, c1 and r1 is to be associated. This triphone 43 has not occurred during the training phase, and that group is to be searched in which this triphone 43 would most likely have been included if it had occurred during the training phase. To this end, it is counted how often the combination l1 and c1 with an arbitrary r or the combination r1, c1 with an arbitrary l has occurred in each group 40, 41 and 42. This is the case three times in the group 40, twice in the group 41 and once in the group 42. Therefore, the triphone 43 is associated with the group 40 because the interrelationship between the central phoneme c1 and one of the lateral phonemes l1 or r1 has occurred most frequently therein. The group 40 then supplies the reference value for use during the recognition of the relevant state of the triphone 43.

One example of the method of determining an acoustic model according to the present invention is shown in FIG. 3. The method derives characteristic values of triphones 45 in a speech test signal during a training phase. The characteristic values represent acoustic triphone states consisting of a central phoneme, a left-hand phoneme and a right-hand phoneme. The characteristic values of the triphones are combined 47, which satisfy predetermined criteria for formation of respective groups of triphones.

Further, in order to model a triphone which has not been observed during the training phase, one of the groups of triphones is selected 49 having the same central phoneme and either a same left-hand phoneme or right-hand phoneme as the unobserved triphone.

We claim:

1. A method of determining an acoustic model for a speech recognition system comprising the steps of:

(i) during a training phase, deriving characteristic values of triphones in a speech test signal, which characteristic values represent acoustic triphone states, each triphone consisting of a central phoneme, a left-hand phoneme and a right-hand phoneme;

(ii) combining the characteristic values of triphones which satisfy predetermined criteria into respective groups of triphones;

(iii) for modeling of a triphone which has not been observed during said training phase, selecting for said unobserved triphone one of the groups of triphones having a same central phoneme and either a same left-hand phoneme or right-hand phoneme.

2. A method as claimed in claim 1, wherein for each acoustic state in a triphone to be modeled there is selected that group which is associated with such acoustic state of the observed triphone having the largest number of combinations of the same central phoneme and either the same left-hand or right-hand phoneme as the triphone to be modeled.

3. A method as claimed in claim 2, wherein for the first acoustic state in the triphone to be modeled the number of combinations with the same central phoneme and the same left-hand phoneme is increased by a fixed value, and for the last acoustic states of said triphone the number of combinations with the same central phoning and the same right-hand phoneme is increased by a fixed value.

4. A method as claimed in claim 1, wherein for each acoustic state in the triphone to be modeled a group is searched for which is associated with that acoustic state in an observed triphone having the same central phoneme and the same left-hand or right-hand phoneme, and if such a group is not available then a group is searched for which is associated with a neighboring acoustic state.

5. A method as claimed in claim 1, wherein in the case of absence of a group associated with observed triphones having the same central phoneme and the same left-hand or right-hand phoneme as the triphone to be modeled, a group is searched for which is associated with the same left-hand or right-hand phoneme but other central phonemes, the number of such triphones in a group which is examined being weighted.

* * * * *